ial Business Machines
United States Patent [19]

Casey et al.

[11] Patent Number: 4,499,596
[45] Date of Patent: Feb. 12, 1985

[54] ADAPTIVE FACSIMILE COMPRESSION USING A DYNAMIC EXTENDABLE DECISION NETWORK

[75] Inventors: Richard G. Casey, Morgan Hill; Theodore D. Friedman, San Francisco, both of Calif.

[73] Assignee: International Business Machines Corporation, Armonk, N.Y.

[21] Appl. No.: 392,839

[22] Filed: Jun. 28, 1982

[51] Int. Cl.³ .............................................. G06K 9/62
[52] U.S. Cl. ..................................... 382/37; 358/260; 382/15
[58] Field of Search .............................. 382/37, 38, 15; 358/260

[56] References Cited

U.S. PATENT DOCUMENTS 3,226,689 12/1965 Amdahl et al. ................... 340/172.5
3,333,248 7/1967 Greenberg et al. .................... 382/15
4,181,952 1/1980 Casey et al. .......................... 364/515

OTHER PUBLICATIONS

Naylor, "Interactive Design of Character-Recognition Logics", Disclosure Document No. T980,008, Mar. 6, 1979.
"Automatic Generation of OCR Logic from Scanned Characters", R. G. Casey, IBM TDB vol. 22, No. 3, Aug. 1979, pp. 1189-1190.
"Two-Level Character Recognition Logic", R. D. Goddard et al, IBM TDB vol. 22, No. 10, Mar. 1980, pp. 4429-4430.
"Means for Achieving a High Degree of Compaction on Scan-Digitized Printed Text", R. N. Ascher et al, IEEE Trans. on Computers vol. C23, No. 1, 11 11/74.

Primary Examiner—Leo H. Boudreau
Attorney, Agent, or Firm—R. Bruce Brodie

[57] ABSTRACT

Preliminary classification of a text character by examining a few of its PELs rather than requiring repeated comparisons of the entire pattern with a large set of prototypes is achieved by following a path through a decision tree in a root-to-leaf node direction. Each tree node specifies the location of a PEL in the character and the input pattern PEL value in turn determines the next branch to follow in the tree. The root node identifies the first PEL to be inspected while the final leaf indicates the class selected. The library pattern and inputs are compared. Upon match, an index number is generated and the next pattern processed. Upon a mismatch, the pattern will be registered as a new prototype in the library, the tree extended to include the new class, and the next pattern will be processed.

5 Claims, 12 Drawing Figures

FIG. 1

DECISION TREE EXTENSION/INSERTION SCHEMA OF FIG. 3

FIG. 6

A BIT REPRESENTATION OF AN INPUT PATTERN AND ITS RELIABLE PEL ARRAY

FIG. 2

FIG. 3
DECISION TREE EXTENSION RESPONSIVE TO SUCCESSIVE INPUT PATTERNS

FIG. 4

INPUT PATTERN EXAMPLES FOR EXTENDING DECISION TREE OF FIG. 3

FIG. 5

INPUT PATTERN EXAMPLES FOR EXTENDING DECISION TREE OF FIG. 3

FIG. 7

```
       ∇ CLASS←FLYD LINES;I;Q;X;N;A;D;SE;REJ;M;NPTS;I1;I2;W;WW;
         T;XCLS;NN;BLROW;DHT;Y
[1]    START∆CPU∆TIME
[2]    I←0 ∆ CLASS←0ρ0
[3]  BR:BLROW←1+(BL[1;] BLCOORDS LINES[I;1])-LINES[I;2] ∆ I←
       I+1
[4]    ∆CLR
[5]    □←I,I ∆ X←φ[1](1+LINES[I; 4 3]-LINES[I; 2 1])↑CHARS[I;
       ;]
[6]    START∆CPU∆TIME
[7]    →OLD×ι0≠1↑ρPROTO
[8]    ⍝ 1ST PROTO
[9]    TC←TC,CPU∆TIME
[10]   DRAW∆PRO X
[11]   START∆CPU∆TIME
[12]   (Y←RELIABLE X) TREEGRO S
[13]   S←S CONCAT RELIABLE(PROTO←PROTO CONCAT X)[1;;]
[14]   TA←TA,CPU∆TIME
[15]   HIGHWIDE←HIGHWIDE,[1] L←(HT∆WDTH X),1+(ρX)[1]-BLROW
[16]   SN←SN,+/NODES[;1]≠0
[17]   ⍝ (H←0.5,CORNER∆COORD,1↑ρPTT) DRAW∆PBOX LINES[I;]
[18]   ((CORNER∆COORD+((1↓SH)×0.1×1+LINES[I;1]),⁻0.8↑SH),(0.8
       ↓SH)) WRITE '⌸'
[19]   →SKP ∆ CLASS←,1
[20] OLD:N←TREECORR3 X
[21]   LPATH←LPATH,PATHL
[22]   D←N≠0
[23]   →NOC×ι~D ∆ CLASS←CLASS,(D/N)
[24]   ((CORNER∆COORD+((1↓SH)×0.1×1+LINES[I;1]),⁻0.8↑SH),(0.8
       ↓SH)) WRITE '+'
[25]   →SKP ∆ TC←TC,CPU∆TIME
[26] NOC:
[27]   ⍝ (0.5,CORNER∆COORD,1↑ρPTT) DRAW∆PBOX LINES[I;ι4]
[28]   ((CORNER∆COORD+((1↓SH)×0.1×1+LINES[I;1]),⁻0.8↑SH),(0.8
       ↓SH)) WRITE '⌸'
[29]   CLASS←CLASS,1+(ρPROTO)[1]
[30]   TC←TC,CPU∆TIME
[31]   START∆CPU∆TIME
[32]   HIGHWIDE←HIGHWIDE,[1] L←(HT∆WDTH X),1+(ρX)[1]-BLROW
[33]   □←'EXTENDING TREE FOR PROTOTYPE NO.',⍕1+1↑ρPROTO
[34]   TREEDEC←TREEDEC,5↑TRD
[35]   DRAW∆PRO X
[36] NEWP:Y←RELIABLE X←((2↓S)⌈ρX)↑X
[37]   Y TREEGRO S
[38]   TA←TA,CPU∆TIME
[39]   SN←SN,+/NODES[;1]≠0
[40]   PROTO←PROTO CONCAT X
[41]   S←(S[;1;] CONCAT Y[1;;]),[1.5]~(~S[;2;;]) CONCAT~Y[2;
       ;]
[42] SKP:→BR×ι(I<1↑ρLINES)
       ∇
```

FIG. 8

```
       ▽
       ▽ Z←RELIABLE P
[1]      ⍝ Z[2;;]=1 IF PIXEL (J,K) IS SURROUNDED BY NBRS OF SAM
         E STATE
[2]      ⍝ Z[1;;]=1 IF PIXEL (J,K) IS BLACK
[3]      Z←P,(0 1 SHFT P),(1 0 SHFT P),(¯1 0 SHFT P),[2.5](0 ¯1
         SHFT P)
[4]      Z←(∧/Z)∨(~∨/Z)
[5]      Z←P,[0.5] Z
       ▽

▽ X TREEGRO PELS;X;C;ND;DNODES
[1]      ⍝ MODIFIES TREE AT 1ST GRAY NODE
[2]      ΔDISCONNECT
[3]      C←(1↑⍴PELS)⍴0  Δ  C←0⍴0
[4]      →SKP×⍳2≠1↑⍴ND←ROOT TREEGRAY X
[5]      C←NCLASS[ND[1];]
[6]      SKP:DNODES←X TREEPLUG C≠PELS
[7]      NCLS←(C\NCLS),1
[8]      NCLASS←(NCLASS,0),[1] NCLS
[9]      NCLASS[¯1+TRAIL;1+⍴NCLASS]←1
[10]     NODES←NODES,[1](1+(⍳0)⍴1↑⍴PELS) ADJNODES DNODES
[11]     ⍝
       ▽

▽ Z←TREECORR3 X;A;S;U;M;D;NPTS;P;LST
[1]      ⍝ DOES TREEMATCH AND CORRELATION TILL MATCH OBTAINED,
         OVER +-1-PEL SHFT
[2]      NTRY←Z←0
[3]      TRD←0⍴PATHL←0
[4]      →0×⍳0=1↑⍴NODES
[5]      S← 5 2 ⍴ 0 0 0 1 1 0 ¯1 0 0 ¯1
[6]      BR:U←ROOT TREEFOL2 P←S[1;] SHFT X
[7]      TRD←TRD,U
[8]      PATHL←PATHL+¯1+⍴TRAIL
[9]      M←P DDMATCHY PROTO[Z←U;;]  Δ  NPTS←(+/+/X)+(+/+/PROTO[U;
         ;])
[10]     NTRY←NTRY+1
[11]     →0×⍳D←(M÷NPTS)≤THRESHOLDΔMATCH
[12]     →BR×⍳(0≠1↑⍴S← 1 0 ↓S)
[13]     Z←0
       ▽
```

FIG. 9

```
      ∇ N←ROOT TREEGRAY X;A;DECNODE
[1]    ⍝ FINDS 1ST GRAY NODE FOR 2D TERNARY INPUT
[2]    N←(⍳0)⍴ROOT
[3]    DECNODE←0
[4]    →0×⍳0=⍴TRAIL←,(N≠0)/N
[5]    RECLOOP:→TOOBIG×⍳∨/(1↓⍴X)<A←NODES[N; 1 2]
[6]    →OUT×⍳(∨/A=0)
[7]    →END×⍳~X[2;A[1];A[2]]
[8]    N←NODES[N;3+X[1;A[1];A[2]]]
[9]    ENTR:TRAIL←TRAIL,N
[10]   →RECLOOP
[11]   ⍝ PEL OUTSIDE PATTERN FIELD IS CONSIDERED WHITE
[12]   TOOBIG:N←NODES[N;3]
[13]   →ENTR
[14]   ⍝ DECISION NODE; DECNODE IS LAST NODE OF TREE.
[15]   OUT:DECNODE←1
[16]   END:N←N,DECNODE
      ∇
```

FIG. 10

```
        ∇ Z←Y TREEPLUG PELS;SS;A;PEL;S1;CLS;PS;X;N;L;M;AMAP;SS1;
          DIM;D;Q
[1]     ⍝ DESIGNS A TREE TO DISCRIMINATE X FROM S
[2]     ⍝ NULL TREE IF PELS HAS NO CLASSES
[3]     NCLS←(1,1↑⍴PELS)⍴1
[4]     →0×⍳0=1↑⍴PELS ∆ Z← 1 4 ⍴0
[5]     DIM←(2↓⍴PELS)⌈(1↓⍴Y)
[6]     Y←(2,DIM)↑Y ∆ PELS←((2↑⍴PELS),DIM)↑PELS
[7]     ⍝ REDUCE PEL MATRIX TO 1-DIMENSION (2 PLANES) FOR EACH
          PROTO
[8]     N←0 ∆ Y←(2,×/DIM)⍴Y ∆ PELS←((1↑⍴PELS),2,×/DIM)⍴PELS
[9]     ⍝ REDUCE PEL MATRIX TO INCLUDE ONLY PELS RELIABLE FOR
          NEW PROTO
[10]    D←⍴SS←(A←Y[2;])/PELS
[11]    X←A/Y[1;]
[12]    B←∨⌿SS1←SS[;2;]∧SS[;1;]≠((1↑⍴SS),⍴X)⍴X
[13]    Q←⍳1↑⍴SS←B/SS1 ∆ AMAP←DIM COORDS B/A/⍳⍴A ∆ X←B/X
[14]    STRT:→NODIFF×⍳~∨/∨/SS
[15]    N←N+1
[16]    Z[N; 1 2]←PEL←AMAP[PS←(⍳0)⍴SELECT∆PEL SS;]
[17]    L←(⍳0)⍴1↑⍴Z←Z,[1] 1 4 ⍴0
[18]    Z[N; 3 4]←L
[19]    Q←(~SS[;PS])/Q
[20]    NCLS←NCLS,[1] 0
[21]    NCLS[(1↑⍴NCLS);Q]←1
[22]    SS←(~SS[;PS])⌿SS
[23]    →(X[PS]= 1 0)/BLK,WHT
[24]    ⍝ SELECTED PEL IS BLACK FOR DESIGN CLASS
[25]    BLK:Z[N;3]←0
[26]    →END
[27]    WHT:Z[N;4]←0
[28]    END:→STRT×⍳(1↑⍴SS)>0
[29]    ⍝ REMAINING LEAF IS CLASS BEING DISCRIMINATED
[30]    →0 ∆ Z[N+1;3]←1
[31]    ⍝ LAST ROW FAILS TO MISMATCH ALL OTHER ROWS
[32]    NODIFF:SS←A/PELS[Q;1;]
[33]    X←A/Y[1;]
[34]    SS←SS≠(⍴SS)⍴X
[35]    B←∨⌿SS
[36]    X←B/X ∆ SS←B/SS
[37]    →0×⍳0=⍴Q←(3≤+/SS)/Q
[38]    SS←(3≤+/SS)⌿SS
[39]    AMAP←DIM COORDS B/A/⍳⍴A
[40]    Z←SS TREEADD3 Z
        ∇
```

FIG. 11

```
      ∇ Z←CLS ADJNODES DNODES;A;T;B;DN;ND
[1]    →SKP×ι1<ρTRAIL
[2]    ⍝ ROOT NODE IS BEING MODIFIED
[3]    T←0,TRAIL ∆ ROOT←1+1↑ρNODES
[4]    →JMP
[5]   SKP:T←⁻2↑TRAIL
[6]    A←(NODES[T[1]; 3 4]=T[2])∧2ρNODES[T[1];1]≠0
[7]    NODES[T[1];A/ 3 4]←1+1↑ρNODES
[8]   JMP:DNODES[1↑ρDNODES;3]←CLS
[9]    →0×ι0=1↑ρNODES ∆ Z←DNODES
[10]   B←(DN←⁻1 0 ↓DNODES[; 3 4])=0
[11]   ND←(,B)\T[2]
[12]   ND←(ρB)ρND+(~,B)\(1↑ρNODES)+(~,B)/,DN
[13]   Z[ι⁻1+1↑ρDNODES; 3 4]←ND
      ∇

∇ N←ROOT TREEFOL2 X;A
[1]    ⍝ CLASSIFIES 2D INPUT USING SINGLE NODE TABLE
[2]    N←(ι0)ρROOT
[3]    →0×ι0=TRAIL←,N
[4]   RECLOOP:→TOOBIG×ι∨/(ρX)<A←NODES[N; 1 2]
[5]    →OUT×ι(∨/A=0)
[6]    N←NODES[N;3+X[A[1];A[2]]]
[7]   ENTR:TRAIL←TRAIL,N
[8]    →RECLOOP
[9]    ⍝ PEL OUTSIDE PATTERN FIELD IS CONSIDERED WHITE
[10]  TOOBIG:N←NODES[N;3]
[11]   →ENTR
[12]   ⍝ DECISION NODE; DECNODE IS LAST NODE OF TREE.
[13]  OUT:
[14]   N←NODES[DECNODE←N;3]
      ∇
```

FIG. 12

ADAPTIVE FACSIMILE COMPRESSION USING A DYNAMIC EXTENDABLE DECISION NETWORK

TECHNICAL FIELD

This invention relates to the conversion of dot matrix characters into coded vector form by adaptive methods and means.

BACKGROUND

Ascher et al, 23 IEEE Transactions on Computers, pages 1174–79, November 1974, describes machine implementable adaptive pattern matching in order to compress optically scanned documents for facsimile transmission or storage. In this regard, Ascher uses a stored program controlled machine in which he forms similarity classes, derives a class prototype, and achieves compression by encoding each character in the stream as the nearest class prototype.

In Ascher the digital images are segmented into dot pattern areas or sub-arrays of black-white pels. The patterns are sequentially grouped into classes according to a measure of their similarities such as Hamming distance. The first pattern put into a class is registered as the class prototype. As the process continues, each new segmented pattern is compared with the prototypes accumulated up to that point. If it matches any prototype, then the class index rather than the entire pattern, is recorded in the output data stream. This thereby increases the compression ratio. If no match is found, the full segmented pattern is recorded in the output stream and the pattern is also used to form a new class and prototype which are added to the available set.

Goddard et al, 22 IBM Technical Disclosure Bulletin, page 4429, March 1980, teaches the use of computer executed tree recognition followed by template comparison. That is, an input pattern is identified by way of a tree search of characters in the library. The search output is a tentative identification of the input character. The original character is then compared with the prototype indicated by the search. If the two characters match within some safe distance, then the identification is confirmed.

Casey, 22 IBM Technical Disclosure Bulletin, pages 1189–90, August 1979, describes a computer implementable method for constructing a decision tree used with an OCR algorithm. The method involves the estimation of picture element (PEL) statistics for each character type and the alteration of the OCR decision tree utilizes the statistics. Parenthetically, PELs assume either one of two color values, namely, black or white.

The aforementioned art suffers the disadvantage that most input patterns must be compared on a PEL by PEL basis with a large number of prototypes in order to find a match. This requires considerable computation time and further may require significant buffering where speed matching between information source and sink is required.

THE INVENTION

This ivention is invoked at the point in the optical character recognition (OCR) process where characters have been obtained from a document whose objects have been scanned, thresholded, and segmented. More particularly, the invention relates to machine implementable methods and means for adaptively assigning an index number unique to each distinguishable input character PEL array pattern as it is applied. Using the succession of index numbers rather than the patterns themselves results in information compression for either transmission or storage purposes.

This invention uses the notion of "reliable PEL". A reliable PEL is defined to be a PEL all of whose neighbors have the same color value. A reliable PEL may be either "white" or "black".

In the machine implementable method of this invention for adaptively assigning index numbers to successive input character PEL array patterns, the first input pattern is used to initialize both a pattern library and a decision tree whose leaf nodes are in concordance with index numbers assigned to the patterns. With respect to second and subsequent input PEL array patterns, the method comprises the steps of classifying an input pattern as one of the library patterns; verifying the classification; upon a match, generating an index number; and upon mismatch, adding the pattern to the library, assigning an index number, and extending the decision tree.

The step of classifying an input pattern uses a decision tree each of whose nodes identifies a PEL array location. The color value of each PEL drives the branch to a successor node in a root-to-leaf node direction reiteratively until a leaf node is encountered. The verification of the classification is by way of overlaid comparison between the classified library and input patterns such that the weighted PEL color value difference is either within or without a predetermined correlation range. As mentioned, upon a comparison being within correlation range, an index number is generated and the next input pattern is processed.

Upon the comparison being outside the correlation range, the new pattern is added to the library. Also, a reliable PEL array is formed from the input pattern. In this regard, the decision tree is extended by identifying an insertion point, forming a node sub-network from the reliable PEL array of the character and coupling the sub network into the tree at the insertion point. The insertion point is identified as the first node encountered during classification specifying an unreliable PEL at the counterpart input pattern location. After this the process returns to the classification step.

The decision tree/network is modified only at a single node each time a pattern is added to the library. It is the case, that reliable PELs are of interest only in the update of the decision tree. Relevantly, when an input character is processed along the tree, a path from the root to the terminating node means that there exists a coincidence in PEL color value between the input pattern and the "reliable PELs" defining the class or pattern associated with the leaf node, and a disagreement in PEL color value with the "reliable PELs" defining each of the other classes.

It is believed that the prior art does not teach the step of extending the tree upon the mismatch between a tree-selected library and input patterns. Further, tree recognition is based upon weighted attributes rather than a statistical source code characterization. This has several advantages. First, it does not require very complex high speed coding. Second, it is operable whether source symbol statistics are stationary or moving. The method of this invention merely grows a sub tree (network) in order to account for the appearance of new characters.

BRIEF DESCRIPTION OF THE DRAWING

FIGS. 8-12 are APL source code sequences for executing the steps of the method according to the invention. More particularly.

FIG. 9 respectively defines APL sequences for ascertaining a reliable PEL from an input pattern, verifying whether a decision tree selected library pattern matches the input pattern, and extending the decision tree.

DESCRIPTION OF THE PREFERRED EMBODIMENT AND INDUSTRIAL APPLICABILITY

Design Assumptions

This invention is predicated upon several assumptions. First, examples of the same PEL array characters within the same type font assume significant differences only at the character edges. This limits misclassification of the same character. Second, since the reliable PELs between distinguishable patterns differ by at least one PEL, then a decision network or graph such as a tree can represent them uniquely. Third, a minimal resolution may always be obtained for pattern comparison purposes where at least an average stroke width of three PELs is obtainable. This minimal value is necessary in order to produce reliable PELs. Since resolution may always be increased, this permits the use of reliable PELs as a discriminant until more than one PEL variation is encountered.

PEL and Reliable PEL Arrays

Figure 2:
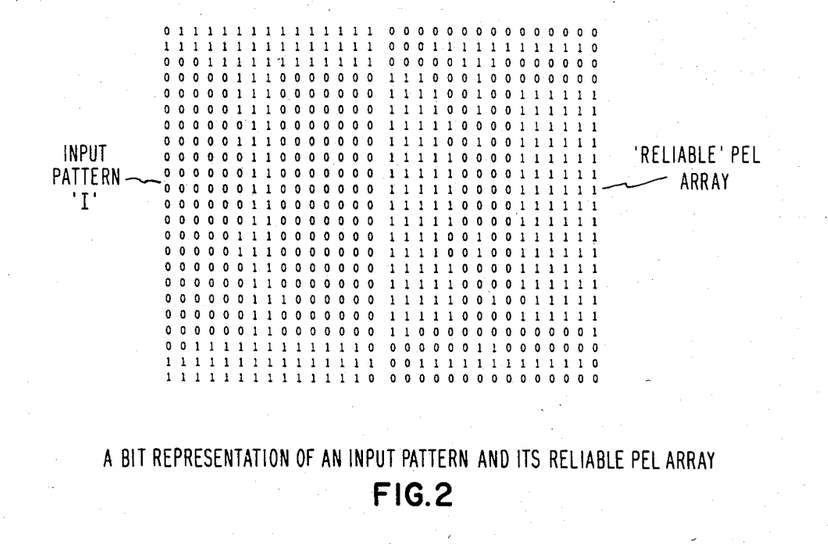
FIG. 2 sets out a bit representation of an input pattern and the reliable PEL array derived therefrom.

Referring now to FIG. 2, there is shown a bit representation of an input pattern and its reliable PEL array. Recalling that a reliable PEL is said to exist wherever the contiguous near neighbors all have the same color value. An input pattern of ones and zeros on the left hand side defines the character "I". For purposes of reliable PEL determination, the input pattern is considered to be entirely surrounded by white PELs.

In the input pattern array a "1" represents black while a "0" denotes a white PEL. In contrast, in the right hand array a "1" denotes a "reliable PEL" while a "0" denotes a so-called grey PEL (unreliable). In determining the presence of the reliable PEL, note that in row 2, column 7, a black PEL is surrounded orthogonally by black PELs. Thus, it is represented by a "1" in a counterpart position in the right hand reliable PEL array. Note further, that in row 9, column 3, in the input pattern a white PEL is surrounded by white PELs. It is represented by a counterpart "1" in the same location in the right hand array. Most of the grey PELs are at the defining edges. They would be represented by zeroes in the counterpart position of the right hand array.

Method Executable on an APL Language Processor and Equivalents

This invention has been implemented on an IBM 370/3033 CPU for running under an APL interpreter defined by the APL Language Processor, Release No. 3 published in the IBM Manual No. GC26-3847, 5th Edition, in 1978. In this new machine use, dot matrix characters obtained from optically scanned, segmented, and thresholded documents are analyzed one input pattern at a time and converted to coded vectors for subsequent transmission or storage. The operating system of the IBM 3033 conforms to the IBM 370 systems architecture. This is described in Amdahl, U.S. Pat. No. 3,226,689, and in the publication "IBM Systems/370 Principles of Operation", form A22-7000-4. Relatedly, reference can be made to Casey et al, U.S. Pat. No. 4,181,952, issued Jan. 1, 1980, which describes a machine implementable method, also running upon IBM's system 370 having resident an APL/360 interpreter described in IBM publication LY20-2678, entitled, "APL/360-OS and APL/360-DOS System Manual", published in February 1975. Another CPU capable of directly executing APL statements is the IBM 5100 containing an APL interpreter and firmware. This is described in IBM 5100 Math/APL Users' Guide, First Edition, August 1975 in publication No. 5721-XM2. Although a reduction to practice has used APL source code, compilable language functional equivalents to an interpreting language may be made absent undue experimentation. Reference should be made to Minsky, "Computation—Finite and Infinite Machines", Prentice-Hall, 1967, pages 107-114, especially at page 108.

Description—How Organized

The description will be set out in two cycles. First, a qualitative cycle describing the input patterns, adaptive decision tree preclassification designating a library stored pattern, verification, and if, upon mismatch decision tree adaptation. The first cycle sets out the method step responses to an input series of six dissimilar patterns. The second cycle includes a synoptic analysis of the APL source code on any APL Language Processor.

The Method Steps

Figure 1:
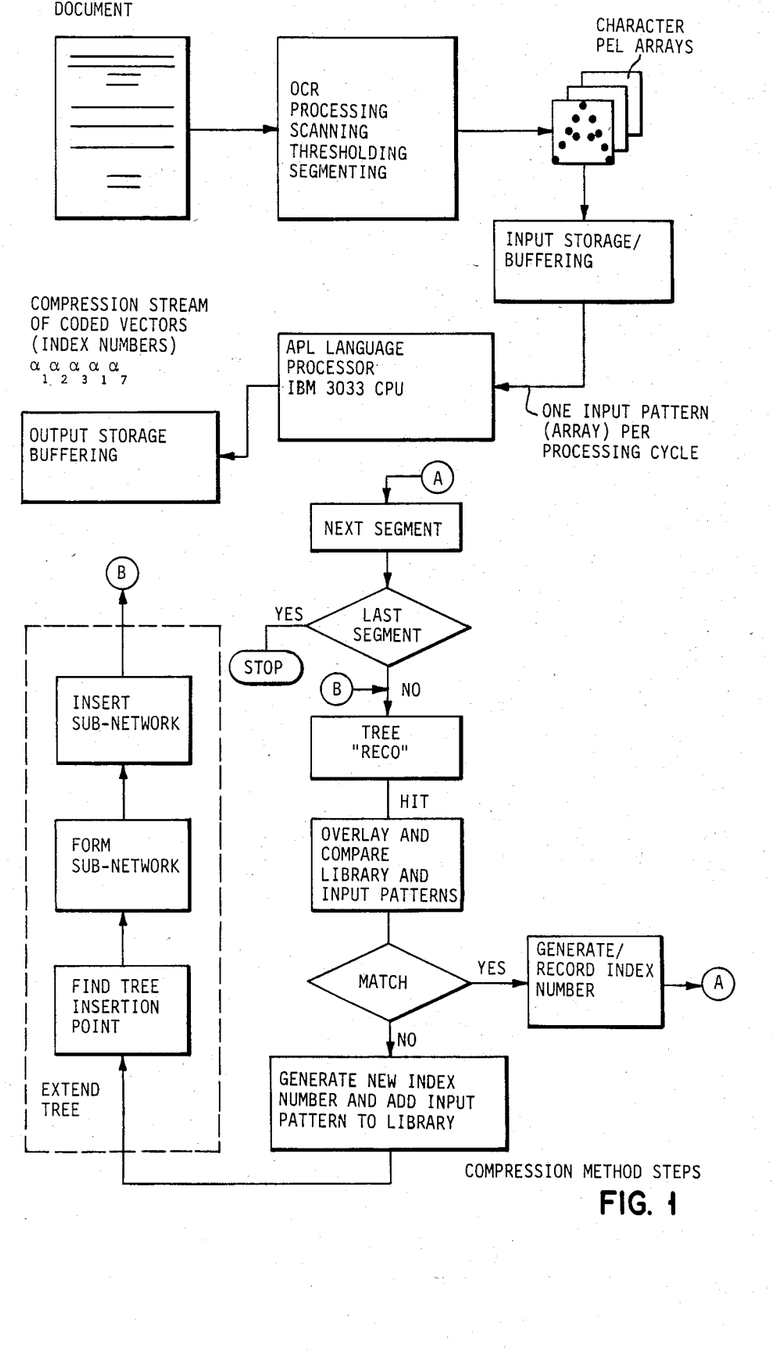
FIG. 1 depicts a flow chart of the dot matrix to coded vector conversion method according to the invention.

Referring now to FIG. 1, there is shown a flow chart defining the processing cycle for converting an input PEL character array into a coded vector output. Each input document is scanned and thresholded and the characters segmented. The method is initiated by using the color value of a PEL whose location is called for by a root node in a decision tree of nodes. The color value of the PEL then determines which branch and hence successor node and location which is to be tested. Assuming that both the tree and the library of patterns have been initialized, the reiterative comparison, color value testing, invoking the successor node terminates ultimately in a leaf node each of which is concordant with an index number defining a pattern presently in the library. The pattern is then retrieved and overlayed onto the input pattern. If the color value differences at the character edges are within a predetermined correlation, the process is terminated and index number generated, and the next input pattern processed.

The step of prototype matching involves a limited shifting in the row and column direction in order to reduce misclassification arising from noise PELs encrusting an input pattern. The decision as to whether there exists a strong correlation is actually a weighting operation in which correspondence in color value among interior reliable PELs are more heavily weighted than edge PELs. If for example the decision tree preclassification had selected library pattern "O" responsive to an input pattern "J" it is intuitively apparent that there would be no matching such that the input pattern "J" would be added to the library and assigned an index number.

Significantly, given a mismatch, the decision tree would be extended by first identifying an appropriate insertion point in the tree, forming a sub-network whose nodes each define an array location of interior reliable PELs, and then adding the sub-network to the tree. At this point a tree comparison is made, a matching condition found, and an index number outputted. The process is then returned to the reference state ready to accept the next input pattern.

The Decision Tree

Figure 3:
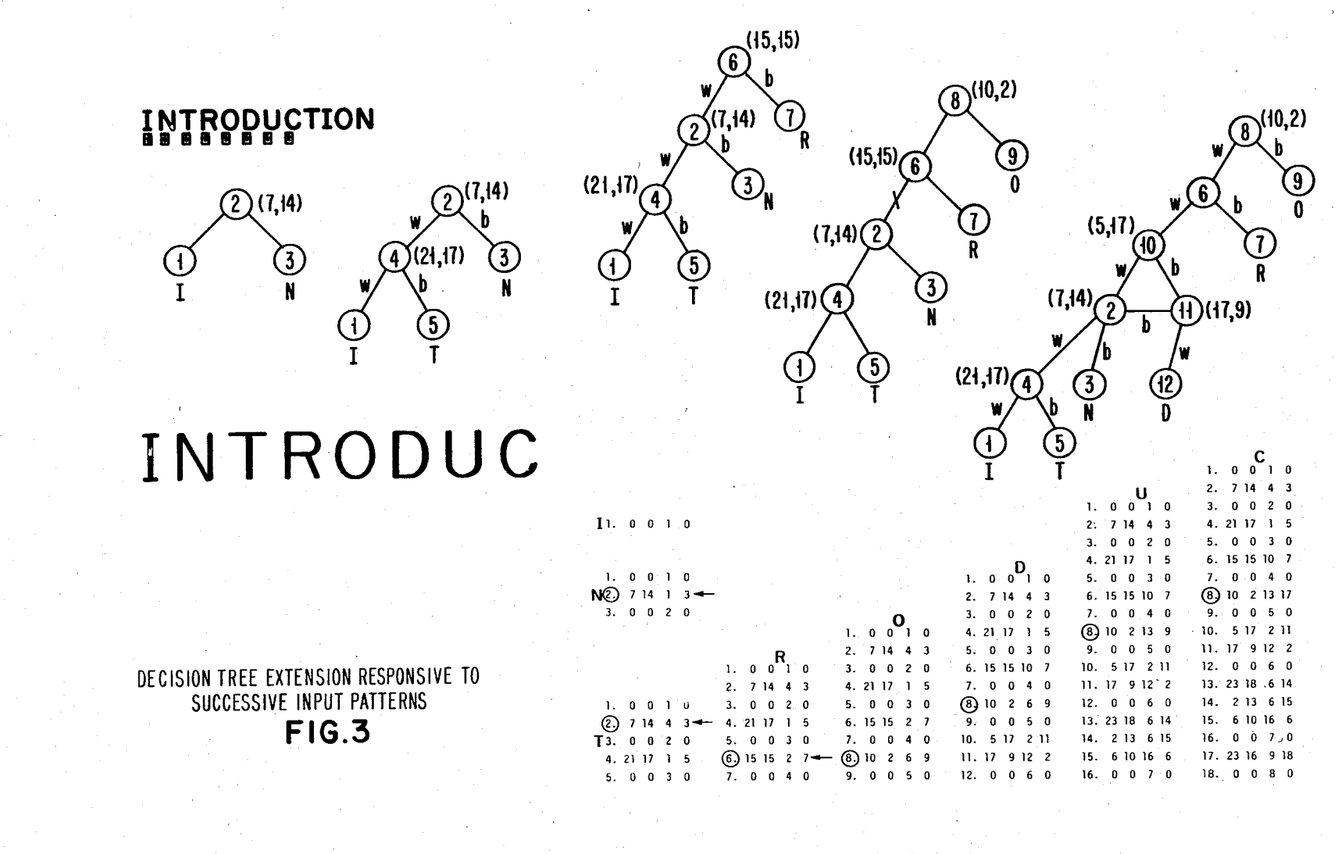
FIG. 3 shows decision tree extensions both tabularly and graphically responsive to successive input patterns.

As mentioned, the method of this invention consists of a preclassification step involving a sequential decision process in which a series of PELs is examined by a classifier (decision tree). The choice of the next PEL to be examined depends upon the values of the PELs seen previously. Each PEL eliminates one or more classes from consideration, and when only one candidate class remains, its identifier is inserted as an output. This procedure can be represented as a binary network as shown for example in FIGS. 3 and 6. The PEL coordinates are stored at the interior nodes and two branches leave each interior node. One branch corresponds to a white or "0" value for the PEL while the other corresponds to a black or "1" value. The terminal nodes contain the decisions or class identifiers. The network contains a single starting point called a root node. The decision tree is predefined on the basis of previous input character PEL array patterns. Said tree is stored as a table in memory. The decision tree and library remain fixed during routine operations as long as the decisions are verified by a subsequent pattern-matching stage. The tree, as shown in FIG. 3 is in the form of an integer number array. The leftmost column is the node number. The next pair of columns define the input pattern PEL array address whose color value is to be tested. The rightmost pair of columns define the branches to the next node according to whether the current PEL color value is either white or black. Correlated with the tables are an arbitrary series of input PEL patterns depicted in large scale in FIGS. 4 and 5. Note, that each of the input arrays has a row and column index. The sequence to be applied to this system is "INTRODUC".

Initialization and Dynamic Tree Growth

Since the method of the invention is dynamic, the decision tree grows rapidly as a function of the dissimilarity or lack of repeatability in the input patterned character array stream. On the top of FIG. 3 there is depicted the decision tree in graphic form counterpart to its tabular representation at the bottom of said figure. The first input pattern initializes both the tree and the library of patterns. Subsequent non-corresponding patterns cause the tree to grow and result in a more complex networking.

Referring now to FIG. 3, there is shown black/white character PEL arrays. Each array has its row and column coordinates numerically monotonically indexed. Since the first pattern "I" is to be used to initialize the system it will be entered into a table describing a decision tree as an arbitrary row one. Note that the leftmost row entries "00" denotes a leaf or terminal node. The pattern itself is stored in the pattern library in its unvarnished PEL array form.

The Decision Tree and Processing the Second and Subsequent Inputs

Figure 4:
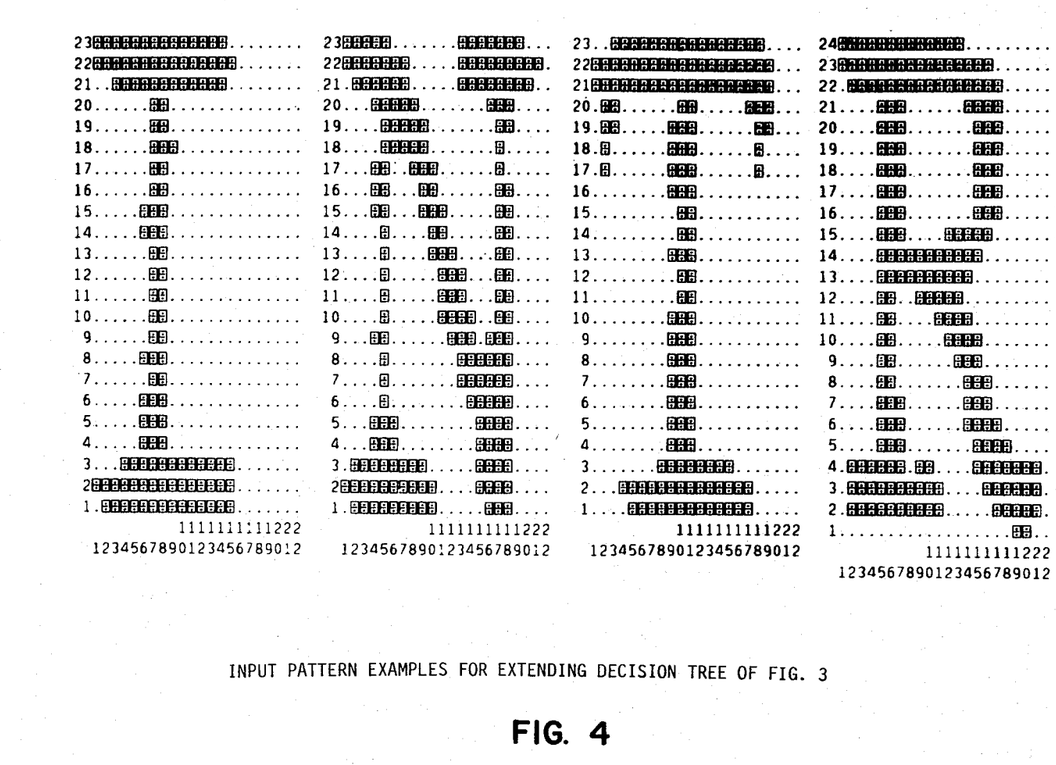
FIGS. 4 and 5 show edge noise encrusted input patterns at the bit array level used for extending the decision tree of FIG. 3.

Referring now to FIGS. 3 and 4, it is apparent that the second pattern "N" is assumed by the decision tree to be a letter "I". This is because the tree has only one entry and that is the initial input "I". At this point, the "I" array is withdrawn from the library and overlaid upon the "N" array. Since at this point it may be assumed that there is no substantial correlation, it is then necessary to amend the tree network. This would consist of adding a root node and a leaf node. The new leaf node will be correlated with the second input pattern "N". The root node is an arbitrary black reliable PEL location interior to the second pattern, the color value of which at a counterpart array part in the first pattern is a reliable white PEL location. More particularly, in the "N" input array there exists a black reliable PEL at location 7,14. The counterpart in the "I" array is a white reliable PEL. The table is modified by a second row entry labeled "for node 2" defining an array location 7,14. If the reliable PEL at that location is white then the next node to be examined is "1". If the PEL at that location is a reliable black "1" then the next node to examine is to be found in row 3. This defines a terminal or leaf node associated with the second input. The entry for node 3 has a 00 in the left hand column pair and an index number 2, which is assigned to the second image input.

The third input pattern is the character array for "T". The table at this point in time has only three entries. Starting at the root node 2 it is necessary to obtain the color value at location 7,14 in the PEL pattern associated "T" in FIG. 4. Since this is a white PEL, then the successive node is "1". This node is a leaf or terminal node and has a concordance with the library pattern "I". "I" is now retrieved from the library and its PEL array overlaid with that of the input pattern "T".

Verification of Preclassification

It should be appreciated that the step of correlating a selective library pattern with an input pattern involves overlaying one array on top of the other array and then comparing array color values at counterpart locations. Since an input pattern may be noisy, encrusted, especially at the edge of a character, it is necessary to make several comparisons. This consists of comparing the array exactly superimposed and then shifted up by one row, down by one row, left by one column and right by one column. A weighting scheme is used. These assume such values as "0" if both patterns match, a first value if a PEL is unreliable in one pattern and its counterpart is reliable, a second value if the PELs differ in color and are reliable in both patterns. This latter case is a strong mismatch indication. It is apparent that, apart from the stem, there is no strong correlation between the input pattern "T" and the library pattern "I". Consequently, a new pattern "T" is added to the library. Also, a reliable PEL array is formed from this input pattern.

Amending the Decision Tree

Next, the decision tree must be extended by identifying an insertion point, forming a node sub-network from the reliable PEL location interior to the character, and coupling the sub-network into the tree at the insertion point. Parenthetically, the insertion point is identified as that node specifying an unreliable PEL at the counterpart input pattern location.

In order to identify the insertion point, it is desirable to examine each node in the decision tree in sequence. Here, the PELs at the input array location specified by the node are examined in order to ascertain whether the PEL at that location is reliable, and its color. If the PEL is unreliable, then the identity of the last node whose input pattern exhibits a reliable PEL as well as its successor node is noted. These two node identities specify a branch or a break at which a sub-network is to be inserted. Further, it should be recalled that a reliable PEL is one whose color value at location $X_I Y_J$ matches the color value of those PELs at locations $X_I Y_{J-1}$, $X_I Y_{J+1}$, $X_{I-1} Y_J$, $X_{I+1} Y_J$.

The Insertion Point

Figure 6:
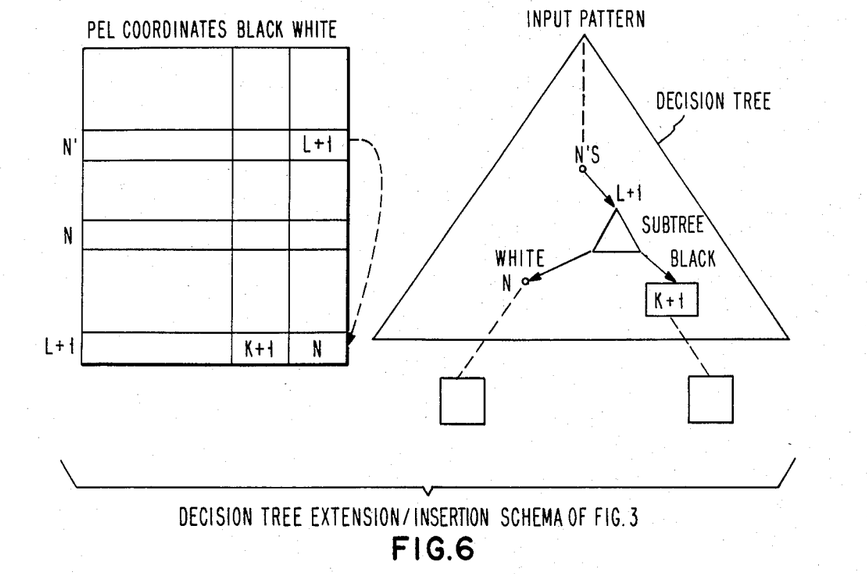
FIG. 6 represents a decision tree extension/insertion schema of FIG. 3.

These principles may be applied with reference to FIGS. 3, 4, and 6. Starting at the root node 2, the color value at location 7, 14 in input pattern "T" in FIG. 4 is a reliable white PEL. Thus, the appropriate node entry is "L". Since node or row 1 indicates a terminal node and we can go no further, it follows that this branch will be broken and the sub-network inserted therein.

Sub-networks

It is an object of the design of the sub-network to so select a reliable PEL that it discriminates between the character patterns assigned to the leaf nodes. This PEL would reference a single interior tree location. For example, in FIG. 4 in the array for T, the PEL is a reliable black at location 21, 17. The counterpart in the "I" array is white. Accordingly, a new node serving as the fourth row in the decision tree table would be entered having a PEL location at 21, 17. If the PEL value in the input pattern at that location were white, then a branch in the decision tree to terminal node 1 should be made. If the PEL value were black then a branch to a terminal node 5 is indicated. Since node 1 is in concordance with the first pattern "I", then the node 5 should be a terminal node in concordance with the input "T".

Insertion and Post Processing

With the insertion of the sub-network consisting of node 4 as a root for the terminal nodes 1 and 5, the process continues by starting at node 2 and examining the color value at input pattern T location 7, 14. Since this is a white PEL the next node is 4. The PEL value at location 7, 14 is black thereby driving the network to show a "T". Since "T" is now in the library, it is withdrawn, superimposed upon the input pattern "T". This shows the correspondence and the associated index number which is one more than the index number for the last library entry which was generated. At this point processing resumes with reference to the next input character "R".

Processing Objects with Interior White PELs

Processing for initial classification starts at "R" (7, 14). Reviewing FIG. 4 and the associated PEL array for "R" a black PEL is encountered. According to the table for node 2 a black PEL means that the next node to be considered is 3. This node is a terminal node in concordance with library pattern "N". A visual inspection of the arrays for "R" and "N" shows that they are not in correlation. At this point, the decision tree will be used to identify the point of insertion of a sub-network in order to modify the tree to accommodate the new pattern "R". If one carefully notices the PEL at location R(7, 14) it is apparent that it is an unreliable PEL. That is, it is an edge PEL contiguous to a white PEL at location 7, 13. Restated, node 2 is terminating an unreliable PEL. Consequently, this calls for an additional node at a location whose PEL value for the input pattern "R" is a reliable interior PEL. In FIG. 4, in comparing the PELs among the instant and preceding patterns at location 15, 15, it should be noted that the color is a reliable black PEL in "R" while it is a reliable and white PEL in each of the three preceding input patterns. Continuing, node 6 would be then entered as the new root node defining a PEL at location 15, 15. A white PEL should lead to the successor node 2 while a black PEL should lead to a terminal node 7. Node 7 is in concordance with the input pattern "R". This pattern is added to the library and a new index number is associated with it. The process then cycles back through the decision tree selecting "R", finding a verification and match.

The next input pattern to consider is "0". It is to be considered with reference to its input pattern shown in FIG. 5 and the decision tree as modified starting at root node 6. The PEL at 0(15, 15) is white. The same is the case at locations 0(7, 14) and 0(21, 17). The tree has thus identified that the closest library pattern is "I". Subsequently, an overlay, comparison suggests no correspondence. The tree must be modified and a point of insertion found. First, the point of insertion starting at 0(15, 15) defines an unreliable white PEL. This is because there exists a black PEL at 0(15, 16). Since node 6 is terminating at an unreliable PEL, a new node 8 is to be added. A reliable interior black PEL is to be found at 0(10, 2). The counterpart reliable white PELs are indicated at I(10, 2), N(10, 2), T(10, 2), and R(10, 2). The tree is modified by insertion of row 8 to finding a PEL location at 10, 2 with a branch to node 6 if the PEL is white and another branch to a terminal node 9 if the PEL is black. Node 9 is in concordance with the input "0". "0" is added to the pattern library, a consecutive index is assigned. Cycling continues as before.

Sub-network Complexity

Figure 5:
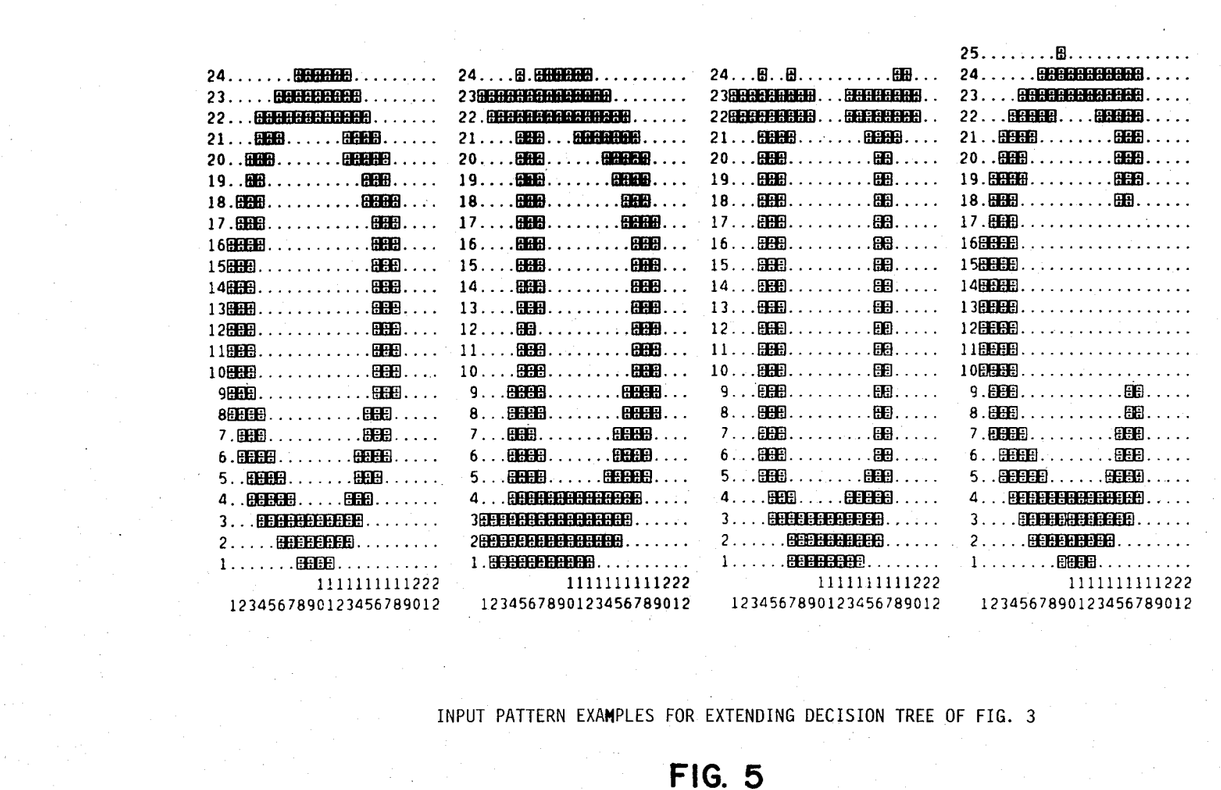

The very next input pattern is "D" to be found in FIG. 5. Examining this pattern, using the node decision tree, starting with the root node 8, it should be observed that D(10, 2), D(15, 15), D(7, 14) are consecutive white PELs while the terminal PEL D(21, 17) is black designating the library pattern "T". Assuming there is no problem in verifying the non-correlation, the point of network modification can be seen to be between D(7, 14) and D(15, 15). That is node 2 identifies unreliable PEL since D(7, 15) is of the opposite color value.

It turns out that in order to differentiate "D" that two interior PELs at D(5, 17) and D(17, 9) are required to differentiate "D" from other patterns. That is, D(5, 17) is an interior black PEL as is N(5, 17) and R(5, 17). I(5, 17), T(5, 17), and 0(5, 17) are white PELs.

A white reliable interior PEL is located at D(17, 9). Also, white reliable interior PELs are present in the remaining input patterns having closed apertures, namely "0" and "R". Black interior PELs may be found at T(17, 9), N(17, 9) while a grey PEL is at I(17, 9). The decision tree table is modified by the 11th row inclusion of PEL location 17, 9 and a branch to node 12 if the PEL color is white and to 2 if black. A 12th node representing a leaf or terminus provides a concordance for pattern "D". The tree modification responsive to input patterns "U" and "C" employ the principles heretofore described.

Relabeling of Branches Upon Amending Tree

Referring now to FIG. 6, there is shown a decision tree extension and insertion scheme of FIG. 3. The insertion of the sub-network usually involves the relabeling of two or more branches. Given a tree branch N', N which is to be broken, then appropriate labeling must be provided between the ancestor node and the new node, and the new node and the descendant node. A tabular representation of these changes is shown on the left of the figure. If the PEL in an input pattern location associated with node N' is white then a branch is made to node L+1. Likewise, if the color value at the location labeled by node L+1 is white then the next node is N.

Sub-network Formation

Figure 7:
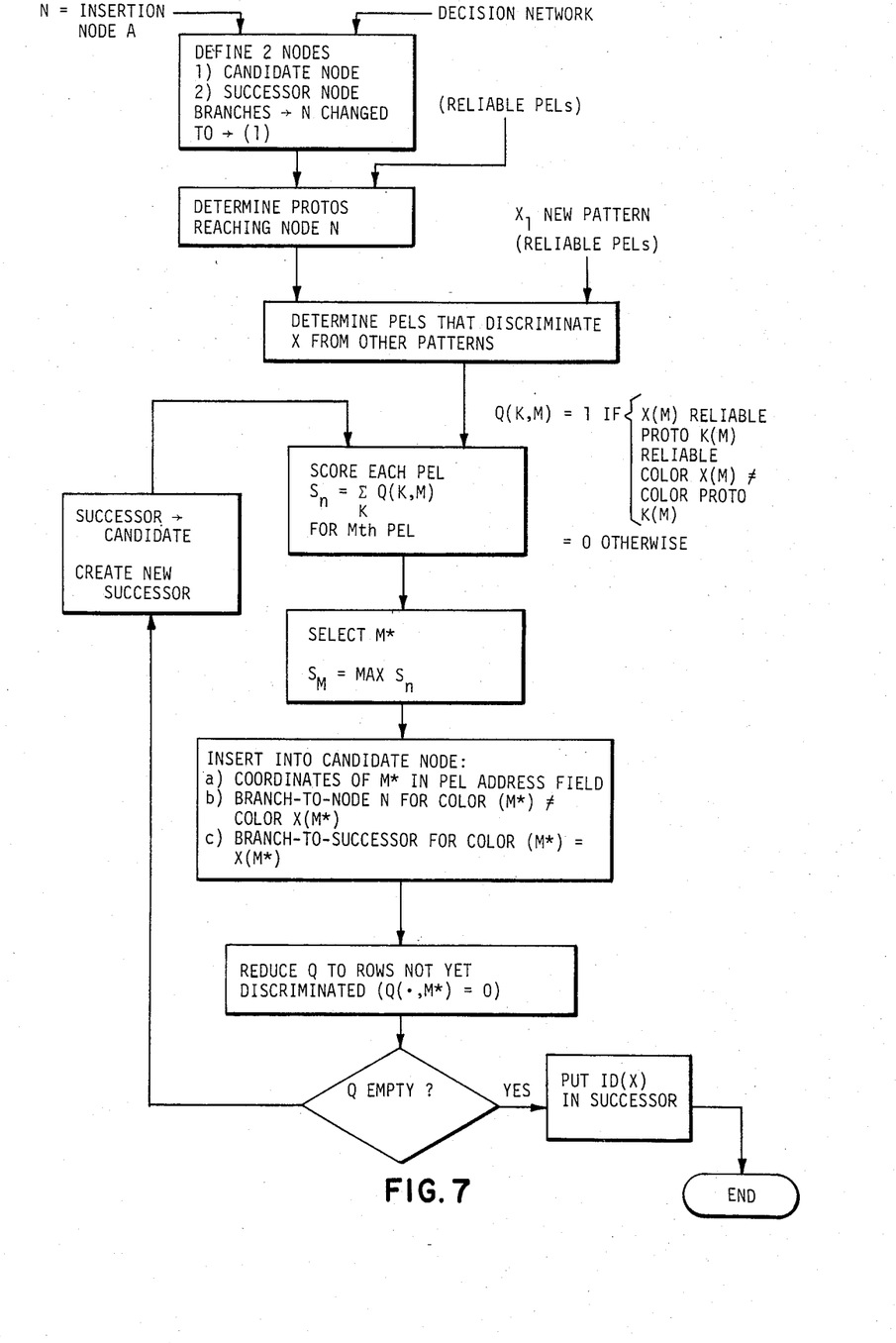
FIG. 7 constitutes a flow diagram of decision tree adaptation.

One of the questions not heretofore completely answered concerns the manner of selecting the interior reliable PEL or PELs for forming the sub-network when amending the decision tree. Reference should be made to FIG. 7, depicting a flow diagram of decision tree adaptations. This diagram is largely focused on selecting the interior black PEL location which will serve as a node by way of a weighting scheme.

Node N as referred to in FIG. 7, is the node at which the network is to be modified in order to distinguish the new library pattern X, from the other patterns therein. A new node, which will be called the "candidate node", is added to the decision network. Any branch into node N in the current network is replaced by a branch to the candidate node. A second new node, called a "successor node", is also defined at this point. The next step of functional significance in FIG. 7 consists of determining which class can arrive at node end during the decision process. The PELs of input pattern X are numbered in an arbitrary sequence. A matrix, Q, is created to identify PELs that are reliable in discriminating X from the library patterns representing these classes. Thus, the entry into row K, column N of Q is "1", if the Mth PEL is reliable in both X and the Kth library pattern, and differs in color value. The entry is "0" otherwise. That is, if the PEL either has the same color in both X and the case library pattern, or is unreliable for at least one of the two.

Next, the modification process enters an interactive sequence of steps that successively chooses PELs in order to discriminate X from the other library patterns.

Each PEL in Q is assigned a score equal to the number of library patterns from which it differs in value from X. The PEL having the largest score is selected for the network modification. The coordinates of this PEL are inserted into the candidate node 2. The branch out of the candidate node corresponding to the color of the selected PEL in X is directed to the successor node. The other branch is directed to node N. The array Q is then reduced by eliminating rows corresponding to library patterns for which the selected PEL discriminates reliably from X. If all library patterns are eliminated by this operation, then the current successor node is made a terminal node and is assigned the class numbers for X and the adaptation routine TREECOR exits. Otherwise, the successor node becomes the new candidate node, a new successor node is created, and the flow returns to the PEL scoring and selection steps.

APL Executable Sequences for Practicing the Invention

Referring now to FIGS. 8-12, there are exhibited APL source code sequences for executing the steps of the method according to the invention on a suitably equipped processor having resident therein an APL language system as heretofore has been described.

Because the APL code is extremely dense and has actually been reduced to practice, no symbol-by-symbol interpretation is given. Rather, the description will identify the qualitative steps and their relationships. It is considered to be well within the ordinary skilled artisan to cause the code to be replicated within an appropriate machine and executed in a normal operating mode.

Figure 8:
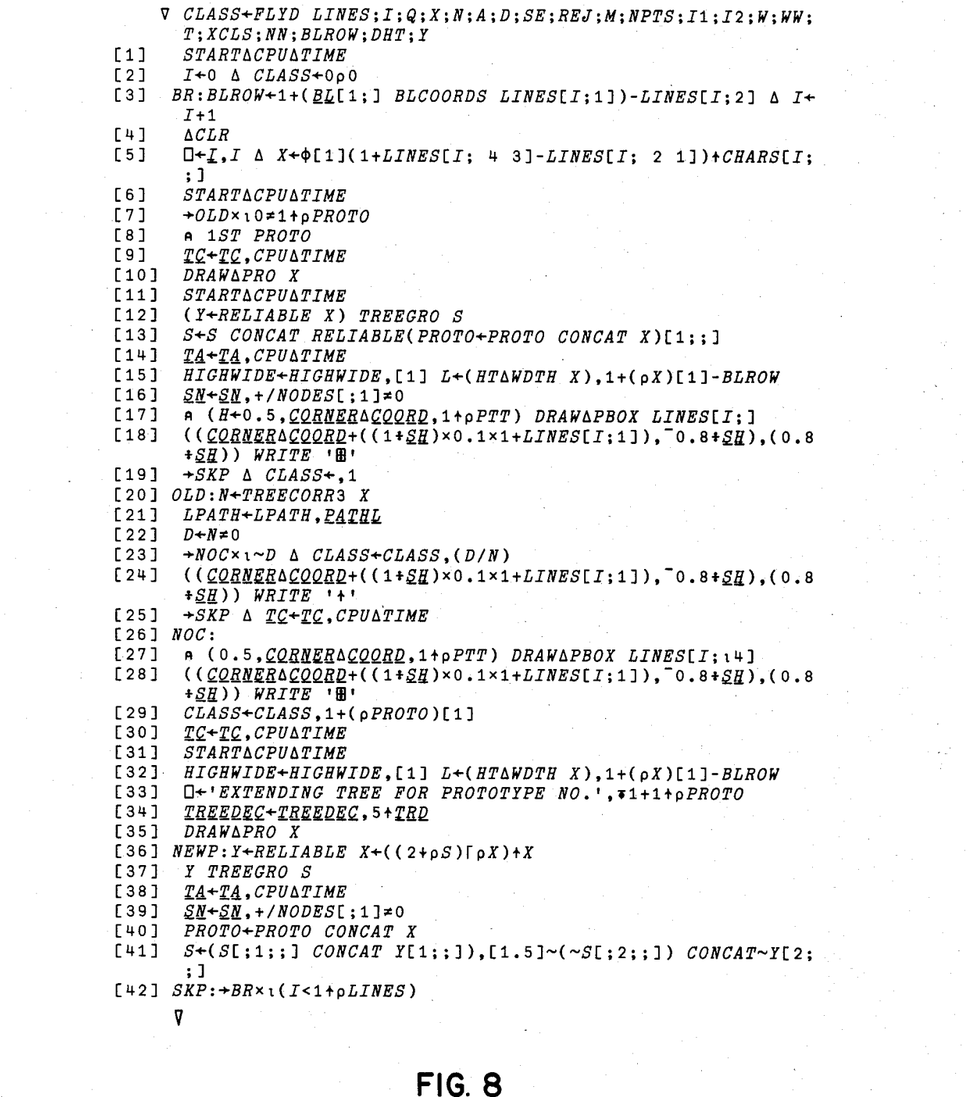
FIG. 8 is the main repeatable sequence of a complete cycle defining the classification and any tree extension responsive to each new input pattern.
Figure 10:
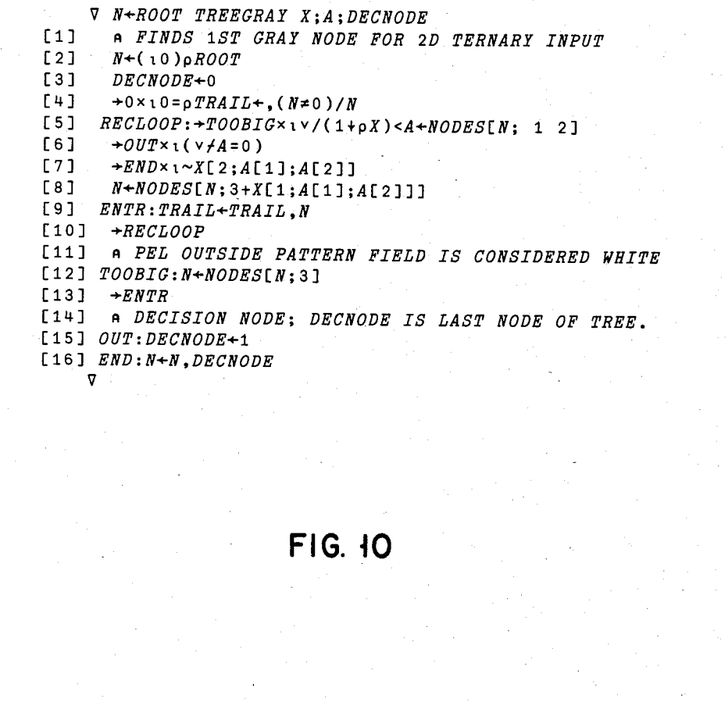
FIG. 10 sets out an APL segment for identifying the first insertion point for extending the decision tree.

Referring now to FIG. 8, there is shown the main repeatable sequence of a complete cycle defining the classification and any tree extension responsive to each new input pattern. On the left hand side are consecutively numbered (in square brackets) statements. Each segment is initiated and terminated by a ∇. The topmost line defines the program name, parameters and variables global to the routine.

Main Sequence CLASS

[1]starts a clock to measure the amount of CPU time to execute a fragment of the routine. Such statements are included merely for the convenience of the experimenter, but are not mandatory for the practice of the invention. In the topmost statement the output is labeled CLASS and is assigned an input pattern to either existing patterns or

[2]is an initialization giving the dimensions of an array. [3]defines a row input pattern corresponding to the baseline, that is the bottom of the PEL array. The necessary processing occurs between [3]and [42]inclusive. One iteration is necessary to classify each character. Note that [7], [11]are merely comment fields and do not affect execution.

The main sequence can be partitioned as follows: [11]through [19]initialize the decision tree and library using the very first input pattern. The second and subsequent patterns are read in and processed between [3]and [10]. A skip is then made to [20]-[22]which invokes the routine TREECORR 3. This latter routine passes the input pattern X through decision network performing preclassifications, and second performs verification by matching the preclassification library pattern with that of the input pattern. [24]tests the output of TREE-CORR 3 to ascertain the match or mismatch condition. If a mismatch a skip is made to [26]NOC. If there is a match in [24]then a skip is made to [40]. After execution of [40]control is returned to [3]to process the next pattern.

Referring again to FIG. 8, a synoptic description is set forth. As a reminder, initialization takes place between lines 11 and 19. Subsequently a loop defined by lines 3 through 10, and 20 through 40 constitute a single processing cycle for the second and subsequent input patterns. Line 40 contains a branch returning to the label DR on line 3 initiating yet another processing cycle.

In [3]a baseline for processing each input pattern is defined. [4]is a convenience instruction clearing the screen of an associated video monitor of the IBM-type 3270.

The substantive processing begins with [5]. In reading the function from right to left, an array CHARS is defined as the storage for the sequence of input patterns to be processed. Next, a bounding rectangle is created in memory into which the current input pattern X can be read into and rotated. [6]to [8]cleanup and articulates the input pattern while [9]is a convenience timing function.

PROTO is an array of arrays. By this is meant that the library of patterns is a data structure of the array type, since each input pattern is in itself an array. In this regard [7] tests the initialization process by inquiring into whether there exists any input patterns (also referenced as program types) in the library. If there is not then [8] is executed. If initialization has been completed then a branch-to-statement [20] is made. The initialization steps involve [14] through [18], since [11]–[13] executes self-evident overhead. Since this phase is an initialization, [14] invokes the routine TREEGRO set out in FIG. 9. The operative step is TREEGRO [6], which in turn invokes TREEPLUG depicted in FIG. 11. For initialization this routine merely assigns a terminating leaf entry in the decision tree (represented by array NODES). This is executed by TREEPLUG [3] and [4]. Control is then returned to TREEGRO with the actual insertions being made by TREEGRO [10]. After this, processing continues in CLASS [15]. Here, S is an array of input pattern reliable PELs. The affect of CLASS [15] is to concatinate input pattern X into the library of patterns PROTO. CLASS [16]–[18] reference housekeeping function. CLASS [19] is a branch to [40]. CLASS [40] is a branch to [3] conditioned upon an index defining whether a pattern is within the text line input. This concludes initializing the decision tree array NODES and the library PROTO.

In the processing of second and subsequent input patterns, the characters are read in by CLASS [5], tested by [7] by way of a branch to [20] conditioned upon there existing a pattern in the library PROTO. Significantly, CLASS [20]–[25] invoke preclassifying an input pattern according to one of the existing library patterns in PROTO, verifying whether they match, and in the event of mismatch branch to [26] while branching to [40] in the case of pattern matching.

CLASS [20]–[25] invokes TREECORR 3. The segment TREECORR 3 shown in FIG. 9.

Figure 12:
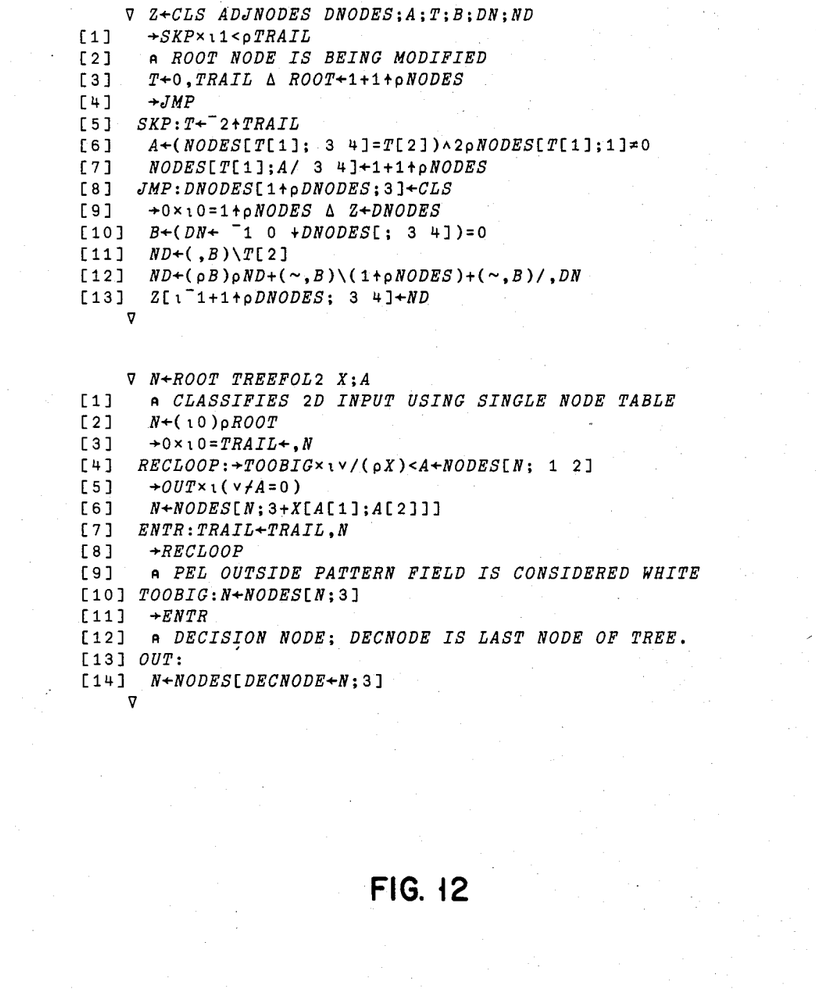
FIG. 12 defines an APL segment which controls the actual insertion of the sub-network into the decision tree.

TREECORR [6] invokes segment TREEFOL 2 in FIG. 12 to process an input pattern X against the decision table NODES to arrive at an initial pattern U. Control passes back to TREECORR [9] which overlays the library pattern on the input X to verify the correspondence by way of a ratio measure MPTS. This yields a dissimilarity measure M. TREECORR [11] terminates the match if the quotient M followed by a NPTS is less than a predetermined threshold otherwise it goes to TREECORR [12] which executes a conditional branch to [6]. This loop constitutes a weighting scheme so that if colors for the same location $(X_IY_I)$ between patterns differ then the loop looks at surrounding PELs.

Control returns to CLASS [24] which executes a branch to [26] conditioned upon there being no match. If there is a match, [25] executes a branch to [40].

At CLASS [27] the array CLASS which assigns input to class or index numbers is updated. A new libary pattern will have an index number one greater than the last index number. Note, that both [30] and [15] create an array HIGH Y which is dimensioned for the input pattern and concatinates the same. In this regard L is the height and width of X as computed by an offline routine.

In order to verify classification by pattern matching, the correspondence is tested by overlaying the patterns, comparing, and if dissimilar, relatively shifting the patterns plus or minus one row and/or plus or minus one cone and testing for a match. This relative shift and compare of arrays of reliable PELs for all preceding library patterns together with array Y is processed to identify insertion points in the tree, form a sub-network, and place the network in the tree. That is, TREEGRO executes the update of the tree by comparing reliable PELs of Y against all previous patterns of S.

Referring now to FIG. 9, there are three processing steps of significance in TREEGRO. These are [4], [6], and [10]. [4] invokes TREEGRAY. TREEGRAY (FIG. 10) examines each node location defined in the tree array NODES in sequence. It then compares the PEL color value at the coordinates specified by the node and ascertains whether that PEL is reliable. If the PEL is unreliable, TREEGRAY identifies the last node whose input pattern location exhibits a reliable PEL. The two nodes specify a range or break at which a sub-network is to be inserted. Returning to TREEGROW [6], there is invoked TREEPLUG at FIG. 11 for designing a sub-network which, when included within the tree will discriminate X from S. The operative statements in TREEPLUG include [10]–[13]. These form a matrix FS which contains one column corresponding to each reliable PEL in the new library pattern X, whose reliable PEL array Y is one of the inputs to TREEPLUG. Each row of FS corresponds to one of the existing library patterns represented in the reliable PEL array PELS An entry on row I, column J of SS is "1" if the Jth PEL of X compared against the same PELs of the pattern is reliable in both, but differs in color value. Otherwise the entry is "0". Thus, the "1"'s of SS identify those reliable PELs of X that are useful in discriminating against other patterns. The row, column locations of the PELs represented in SS are stored in a two-column array AMAP.

Figure 11:
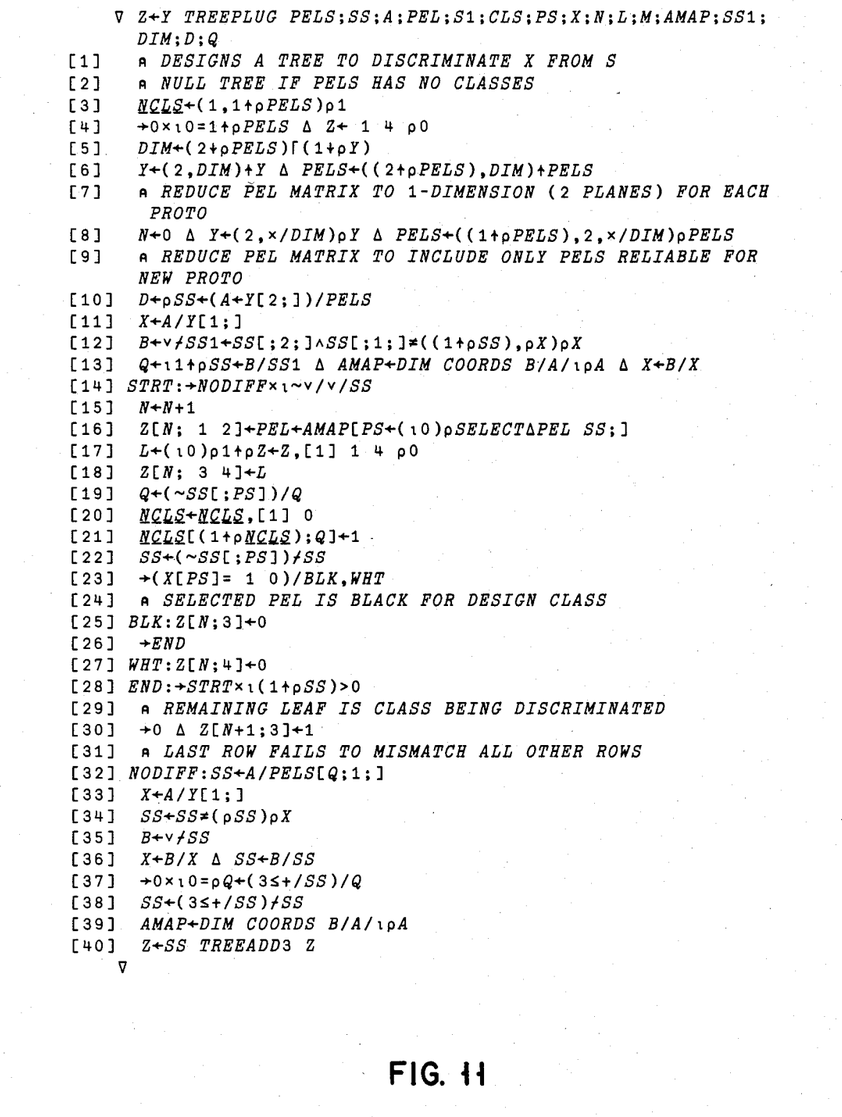
FIG. 11 is the APL segment for generating the sub-network to be inserted into the decision tree.

After the preliminary steps of forming SS and AMAP, a discriminating sub-network Z is computed in an iterative sequence, TREEPLUG [14]–[28]. In this regard, TREEPLUG [14] tests whether SS contains any "1"'s, f not, then discrimination is not possible on the basis of reliable PELs, and the routine branches to TREEPLUG [32]–[40]. Where an exception sequence TREEADD 3, is invoked to implement a discrimination on the basis of unreliable PELs. Such an escape path is contraindicated if the pattern has sufficient resolution. In the very largest fraction of instances such is the case.

If FS is found to contain "1" in TREEPLUG [14], then [16] selects a column of FS containing a maximal number of "1"'s. This is accomplished by invocation of the function SELECT ∇ PEL. The coordinates of the selected PEL are determined by reference to AMAP, and are inserted in the sub-network Z. Execution of line TREEPLUG [19]–[22] results in the deletion from FS of any rows which contain "1"s in the selected column, and also deletes the column itself. The reduced array FS now represents the discriminating PELs from the patterns not yet distinguished from X by the sub-network.

TREEPLUG [23] examines the selected PEL in X to determine its color. The branch address for the other color in the sub-network is set to zero in either [25] or [27]. Parenthetically, the branches corresponding to both colors were set to the successor node address in step [18]. In a subsequent processing step, these "0"s will be replaced by the address of the node at which the sub-routine is incorporated in the main decision network. Finally, after setting the branch addresses, control transfers to [28] where the function may be invoked if FS has be reduced to a NULL matrix, or else branches back to TREEPLUG [14], the start of the iterative sequence.

The last statement [10] in TREEGRO invokes the routine ADJNODES set out in FIG. 12. Significantly, ADJNODES adds the sub-network array to the bottom of the array representing the previously existing network. Also it modifies the addresses of the sub-network to conform to its position in the overall array. With the completion of the sub-network insertion, control returns to CLASS where the appropriate concatination in class [38] and [39] of the array occurs A Generic Restatement The input patterns are a sequence of binary, two dimensional arrays representing scanned characters of the order of their occurrence on a document. The characters are printed on an arbitrary font style, and though very little is assumed regarding their shape or appearance, assumptions can be made regarding the sample-to-sample variations within a given pattern class. The strongest assumption is that such variations occur primarily on the edges of patterns. Consequently, the decision network is designed to discriminate on the basis only of "interior" white or black PELs. The adaptive classification of the inventive method is predicated on the basis of black and white interior PELs determined from a succession of previous patterns. Thus, an input pattern differing from a library pattern (previous pattern) only at edge PELs will be assigned to the class identified with that library pattern. Adaptation consists of modifying the feed network that has this property in such a way that the new network has the same property for the library patterns plus one additional member. A second constraint placed on the modification procedure is that it should be done only oy adding nodes to the existing network. No nodes are to be altered or deleted, although exit branches from existing nodes may be redirected in order to insert new nodes. Assume that the decision tree has been constructed in such a way that for each of K patterns denoted $G_1, G_2, \ldots G_K$. Now, if a new input pattern $G_{K+1}$ is designated then the network is to be extended. The ensemble of patterns that are to be assigned to class $K+1$ consist of all binary arrays obtainable from pattern $G_{K+1}$ by assigning the value "0" to wide interior PELs, "1" to black interior PELs, and arbitrarily "0" or "1" values to its edge PELs. If $G_{K+1}$ contains E"E" edge PELs then $2^E$ members of the class $K+1$ are defined in this way. This set of patterns may be denoted b $R_{K+1}$. The classification process is considered for a member $R_{K+1}$ in $N_K$, where $N_K$ is the decision network before adaptation to $G_{K+1}$. If the root PEL, $X_1$, is an interior PEL of $G_{K+1}$, then all members of $R_{K+1}$ have the same value at this PEL location. The next PEL to be tested, $X_2$, will be the same for every member of $R_{K+1}$. If $X_2$ is interior to $G_{K+1}$, then the third PEL, $X_3$ will be the same for each pattern in $R_{K+1}$ as well. The sequence of PELs examined constitutes a path through the network. This path is the same for every member of $R_{K+1}$ until a node is encountered, which node identifies an edge PEL for $G_{K+1}$. Some of the members of $R_{K+1}$ will follow the white branch from this node, the remainder will follow the black branch. Such a node partitions $R_{K+1}$ into subsets, each of which follows a different path in the network. If any of the subsets encounters additional edge PELs along its path, then further partitioning should occur. Eventually the subsets of $R_{K+1}$ will arrive at various terminal nodes of the terminal network. If the network were left unmodified, the classification associated with these terminal nodes could erroneously be assigned to members of class $K+1$. In amending the decision tree, a pattern $G_{K+1}$ is considered an input to the starting root node $N_K$. This path is traced through the network until it reaches a node, N, specify an edge PEL (unreliable PEL) in the pattern. At this point it is determined which one or more of the library patterns $G_1, G_2, \ldots G_K$, can also reach node N. Denominate this pattern subset H. The branch into node N is reconnected to a sub-network consisting of a sequence of reliable PELs that are interior to $G_{K+1}$ and that discriminate $G_{K+1}$ from the members of H. The specification of this sub-network requires that only members of H rather than the entire library collection need to be discriminated from pattern $G_{K+1}$. A new path is provided leading to a terminal node for class $K+1$, and the other branches are connected to node N.

As is apparent, when processing an input character array, by examining the color values at locations defined by the nodes along the decision tree path, then a path from root to a terminating node means that there exists a coincidence in PEL values between the input character and the "reliable PELs" defining that class or prototype. It is this observation that predicates the method and means of this invention. It will be further understood by those skilled in this art that various changes in form and details may be made therein without departing from the spirit and scope of the invention. For example, the set of input patterns may delineate objects other than the Latin alphabetic type fonts as for example characters in an idiographic language such as Japanese.

We claim:

1. A method for adaptively assigning index numbers to each one of a set of input PEL array patterns in a system formed from a scanner for elucidating input array patterns, a memory for storing pograms and data including a library of at least one pattern, output means, and a processor intercoupling the scanner, memory and output means, and responsive to the programs for operating upon the data, comprising the steps of:

preclassifying an input pattern provided by the scanner according to one of the patterns in the library using color values in the input pattern at each location specified by a decision tree node in order to determine a successor node in a root-to-leaf node direction until terminating in an index number designating a library pattern;

comparing the designated library pattern with the input and either upon a match, generating an index number and processing the next input pattern; or upon a mismatch, generating a new index number, adding the input pattern to the library in the memory, and extending the decision tree; and processing the next input pattern.

2. A method for adaptively assigning index numbers to successive PEL into patterns in which the first pattern is used to initialize a pattern library and a decision tree, the tree leaf nodes being in concordance with index numbers, and in respect to second and subsequent input patterns in a system formed from a scanner for elucidating input array patterns, a memory for storing programs and data including a library of at least one pattern, output means, and a processor intercoupling the scanner, memory and output means, and responsive to the programs for operating upon the data, comprising the steps of:

classifying a pattern aprovided by the scanner as one of the library patterns by reiteraively using the color value of each FEL whose input array location is spcified by a decision tree node to branch to a successor node in a root-to-leaf node direction until a leaf node is encountered;

verfying the classification by comparison between the classified library pattern and the input pattern such that the PEL color value differences at the character edges are either within or without a predetermined correlation; and either generating an index number upon the comparison being within the correlation and processing the next input pattern; or generating a new index number, adding the pattern to the library in the memory, and extending the decision tree upon the comparison being without correlation and processing the next input pattern.

3. A method according to claim 1, wherein the step of extending the decision tree includes the step of identifying an insertion point, forming a node sub-network from reliable PEL array locations interior to the input pattern, and coupling the sub-network into the tree at the insertion point.

4. A method according to claim 2 wherein the insertion point is defined as the branch between a node specifying an unliable PEL array location and its antecedent node specifying the reliable PEL value both at the counterpart pattern locations.

5. A character recognition method implementable on an APL stored program controlled OCR processor responsive to a succession of character PEL arrays representing printed characters on a document after optical scanning, thresholding, and segmenting of their images, said OCR processor being formed from a scanner for elucidating character PEL arrays, a memory for storing programs and data including a library of at least one character array, output means, and a processing element intercoupling the scanner, memory and output responsive to the programs for operating upon the data, comprising the steps of:

preclassifying an input character array provided by the scanner according to one of the character arrays in a library using color values in the input array at each location specified by a decision tree node in order to determine a successor node in a root-to-leaf node direction until terminating in an index number designating the library character;

comparing the designated library character with the input character and either upon a match, generating an index number and processing the next input character; or upon a mismatch, generating a new index number, adding the new input character to the library in the memory, and extending the decision tree by identifying an insertion point, forming a node sub-network from reliable PEL array locations interior to the input character array, and coupling the sub-network into the tree at the insertion point; and processing the next input pattern.

* * * * *